No. 883,841. PATENTED APR. 7, 1908.
J. R. & J. TEMPERLEY & W. ALEXANDER.
TRANSPORTING APPLIANCE AND THE LIKE.
APPLICATION FILED NOV. 28, 1905.

5 SHEETS—SHEET 1.

Attest:
C. S. Middleton
Edward N. Sarton

Inventors
John R. Temperley
Joseph Temperley
William Alexander by Spear, Middleton, Donaldson & Spear
Attys.

No. 883,841. PATENTED APR. 7, 1908.
J. R. & J. TEMPERLEY & W. ALEXANDER.
TRANSPORTING APPLIANCE AND THE LIKE.
APPLICATION FILED NOV. 28, 1905.

5 SHEETS—SHEET 2.

Attest:
C. S. Middleton
Edward N. Sarton

Inventor:
John R. Temperley
Joseph Temperley
William Alexander
By Hear, Middleton, Donaldson & Attys.

No. 883,841. PATENTED APR. 7, 1908.
J. R. & J. TEMPERLEY & W. ALEXANDER.
TRANSPORTING APPLIANCE AND THE LIKE.
APPLICATION FILED NOV. 28, 1905.

5 SHEETS—SHEET 3.

Attest:
C. S. Middleton
Edward N. Sarton

Inventors,
John R. Temperley,
Joseph Temperley,
William Alexander.

By Spear, Middleton, Donaldson & Spear
Attys.

No. 883,841. PATENTED APR. 7, 1908.
J. R. & J. TEMPERLEY & W. ALEXANDER.
TRANSPORTING APPLIANCE AND THE LIKE.
APPLICATION FILED NOV. 28, 1905.

5 SHEETS—SHEET 4.

Attest
S. Masurton
E. Sarton

Inventors
John R. Temperley
Joseph Temperley
William Alexander
by Spear, Middleton, Donaldson & Spear
Attys.

THE NORRIS PETERS CO., WASHINGTON, D. C.

UNITED STATES PATENT OFFICE.

JOHN RIDLEY TEMPERLEY, JOSEPH TEMPERLEY, AND WILLIAM ALEXANDER, OF LONDON, ENGLAND.

TRANSPORTING APPLIANCE AND THE LIKE.

No. 883,841.  Specification of Letters Patent.  Patented April 7, 1908.

Application filed November 28, 1905. Serial No. 289,516.

*To all whom it may concern:*

Be it known that we, JOHN RIDLEY TEMPERLEY, JOSEPH TEMPERLEY, and WILLIAM ALEXANDER, subjects of the King of Great Britain and Ireland, residing at 72 Bishopsgate street within, London, E. C., England, have invented new and useful Improvements in and Relating to Transporting Appliances and the Like, of which the following is a specification.

This invention relates to improvements in hoisting and transporting devices, and has for its object to provide improved methods of and means for hoisting and traversing loads over considerable distances with greater rapidity and ease of control than has hitherto been possible.

The invention consists in an improved transporter device as hereinafter described and set out particularly in the claims whereby the operations of hoisting and lowering are rendered independent of and are unaffected by the operation of traversing and vice versa, it being possible to carry on these operations simultaneously without either affecting the other.

Figure 1:
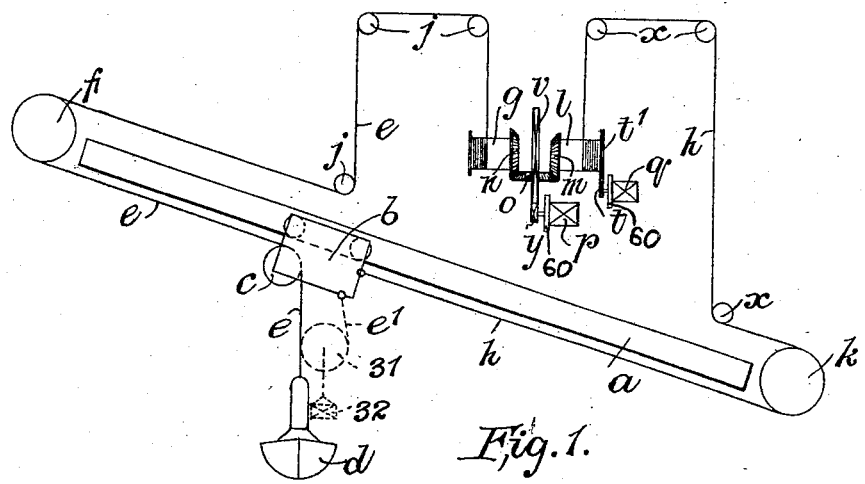
Figure 2:
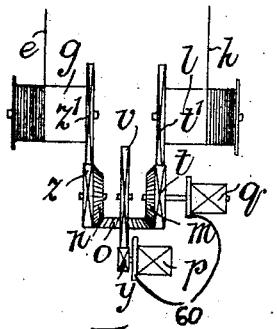
Figure 3:
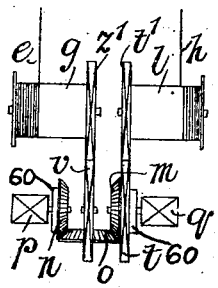
Figure 5:
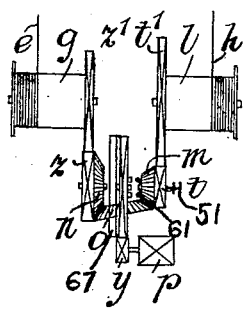
Figure 4:
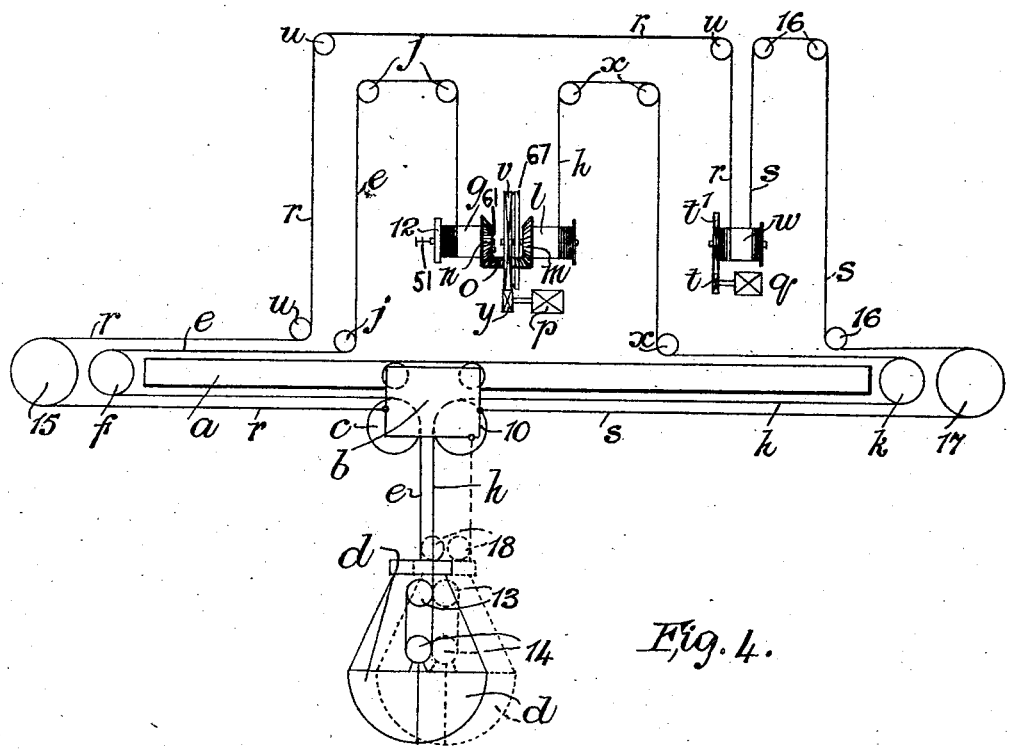
Figure 7:
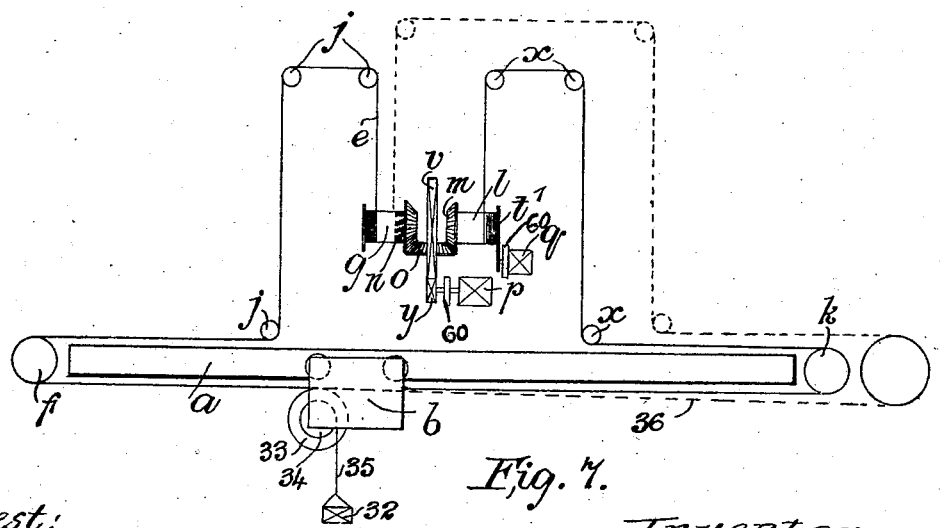
Figure 6:
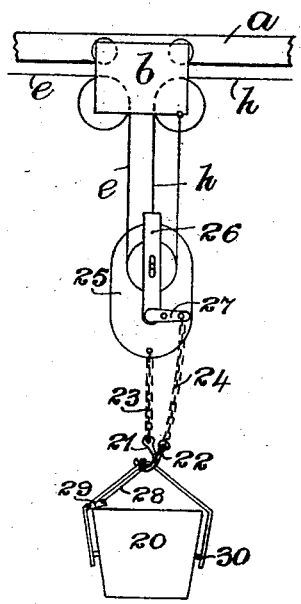
Figure 8:
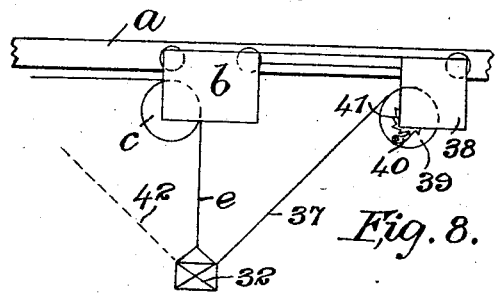
Figure 9:
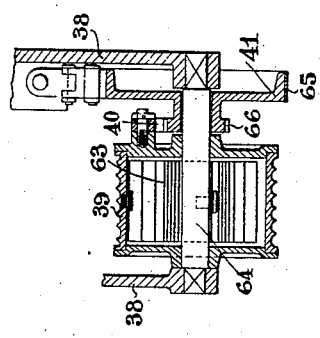
Figure 10:
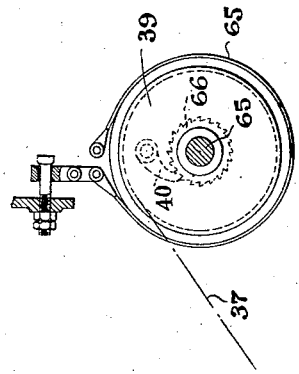
Figure 12:
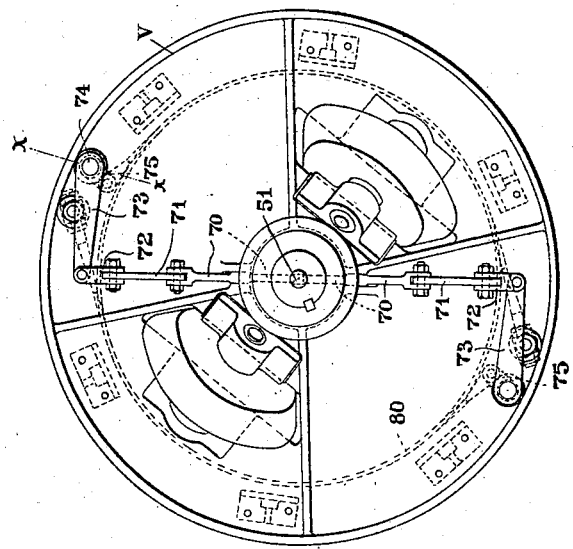
Figure 14:
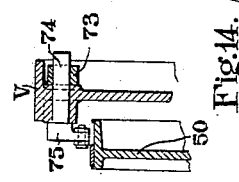
Figure 13:
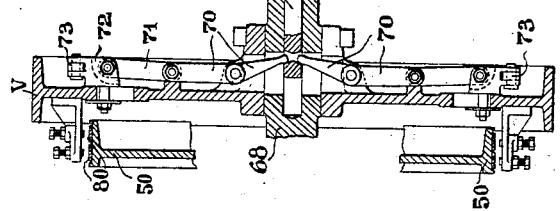
Figure 11:
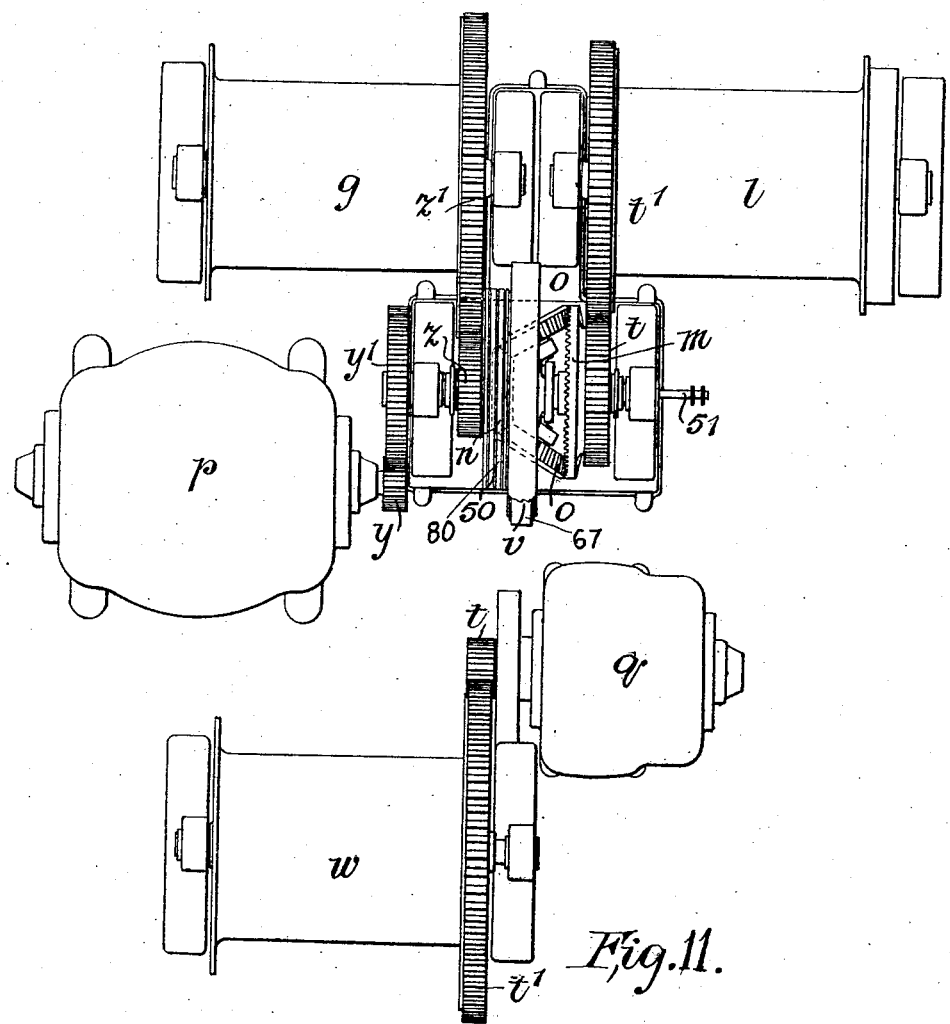

Referring now to the accompanying drawings:—Figure 1 represents diagrammatically a single rope transporter with epicyclic gear according to one form of our invention. Figs. 2 and 3 represent diagrammatically modified epicyclic gear arrangements for a single rope transporter. Fig. 4 is a diagrammatic representation of a two rope transporter with one arrangement of epicyclic and operating gear. Fig. 5 represents a modified arrangement of epicyclic gear for use with a two rope transporter under circumstances hereinafter referred to. Fig. 6 represents diagrammatically an arrangement for tilting a bucket in accordance with the invention. Fig. 7 is a diagram of a modified arrangement of this transporter where the rope is carried around a drum on the carriage. Fig. 8 represents diagrammatically a device for preventing excessive swinging of the loads. Figs. 9 and 10 are sectional elevation and side view of the device shown in Fig. 8. Fig. 11 is a detail view of a form of the device showing a convenient construction of epicyclic gear. Figs. 12 and 13 are face and sectional side elevation of the middle member of the epicyclic gear shown in Fig. 11, this member being shown detached therefrom to illustrate the brake clutch and the means for operating it. Fig. 14 is a part sectional view on the line X—X of Fig. 12.

In carrying out our invention in one manner as applied to a single rope transporter, and as illustrated diagrammatically in Fig. 1, a horizontal or inclined track, $a$, is provided, of any suitable construction, and supported in any convenient manner, a traveling carriage, $b$, being placed on the track. A rope or chain, $e$, attached to a grab, $d$, of the single rope type passes over a sheave, $c$, on the carriage, and thence round a sheave, $f$, near one end of the track, after which it is passed over suitable guide sheaves, $j, j$, led to and attached to a drum, $g$, in the operating winch. From a second drum, $l$, another rope or chain, $h$, is led by guide sheaves, $x, x$, round a sheave, $k$, near the other end of the track, and then attached to the carriage, $b$. To the drum, $g$, is attached one part, $n$, of an epicyclic train of gear wheels, and to the other drum, $l$, is attached a second part, $m$, while the third or middle part, $v$, which carries the loosely mounted bevel wheel, $o$, of the epicyclic gear, the wheel $o$, being in gear with both wheels $n$, and $m$, is connected to a motor, $p$, by a pinion, $y$. Another motor, $q$, is connected through a pinion, $t$, and spur wheel, $t'$, to the drum, $l$, carrying the rope or chain, $h$, the end of which is attached to the carriage, $b$.

If while the motor, $q$, is at rest, the motor, $p$, is started, the drum, $g$, is rotated through the gearing, $v$ and $o$, of the middle part of the gear, and $n$ of the first part, and the drum, $l$, remains at rest. By this means the grab, $d$, is raised or lowered according to the direction of rotation and speed of the motor, $p$, alone.

If while the motor, $p$, is at rest the motor, $q$, is started, then the drum, $l$, is rotated, and through the gearing, $m, o$, and $n$, the drum, $g$, is also rotated. By this means one of the ropes, $e$, or $h$, is wound in, and at the same time the other is paid out, causing the carriage, $b$, to move along the track in one direction or the other, according to the direction of rotation and speed of the motor, $q$, alone.

If both motors are started at the same time, the grab is lifted or lowered at the same time as the carriage is moved along the track in one direction or the other, according to the directions of rotation of the two motors. It will be seen that the operations of lifting or lowering the grab, and of moving the carriage along the track, are quite independent of each other, that is, they may be carried out separately or simultaneously, without either operation in any way affecting the other, even when one is in progress and the other is suddenly put into operation also. Suitable brakes (shown diagrammatically at 60) are fitted in connection with each of the motors, p and q, to hold the parts operated by them when the motors are at rest, or to regulate the speeds at which they run when in motion. Any known means of opening and closing the grab may be employed.

In Fig. 2 the parts, m and n, of the epicyclic gear, instead of being directly connected to the drums are mounted separately, and connected to the drums l and g, by spur gearing, t, t', z, z', and in Fig. 3 the epicyclic gear is shown arranged in another manner the wheel, v, of the middle part of the train being connected to the drum, g, by gearing with a wheel, z', and the part, n, which gears with the wheel, o, of the middle part, is connected to the motor, p, the part m, remaining in connection with the wheel, t', of the drum, l, through the wheel, t, and being secured on the shaft of the motor q. It will be seen that the motions resulting from the starting of the two motors respectively are the same as before. The three parts of the epicyclic gear, the two drums and the two motors, may be arranged in any convenient manner, so long as the drum, g, is driven by the motor, p, indirectly that is, through the epicyclic gear, and the drum, l, directly connected or geared to the motor, p, by which it is to be driven.

When a grab of the two rope type is to be employed, we provide (as shown in Fig. 4) two drums, g and l, connected together through epicyclic gearing as above described. A rope, e, attached to the frame of the grab, d, passes over pulleys as before described, and is connected to the drum, g. The second rope, h, passes from the second drum, l, of the operating winch over pulleys, x, x, x, k, and a sheave, 10, mounted in the carriage, b, and round the opening and closing mechanism, 13 and 14, of the grab, a brake, 12 is fitted in connection with the drum, g, so that thereby it may be held from rotating when required. A suitable brake (not shown) is also fitted in connection with the motor, p.

A clutch or other device 61, shown diagrammatically in Figs. 4 and 5, and in detail as a band clutch in Figs. 11 to 14 is fitted in connection with the epicyclic gear, so that the parts thereof may be connected so as to be forced to revolve together or at a fixed relative rate by allowing a certain amount of slip at the band clutch when required. A third drum, w, is provided in connection with a second motor, q. This drum and motor are quite independent of the others. From one side of the drum, w, a rope, r, is led round sheaves, u, u, round a sheave, 15, near one end of the track, and attached to the carriage, b. From the other side of the drum, w, a rope, s is led round sheaves, 16, 16, 16, round a sheave, 17 near the other end of the beam, a, and is attached to the carriage, b.

If the brake, 12, is off and the parts of the epicyclic gear left free and the motor, p, is started, the drums, g, and l, both revolve, and the epicyclic gear acts as a balancing gear maintaining a constant relation between the strains on the ropes, e and h. According to the direction of rotation the grab, d, is lifted or lowered, and as the rope, h, is maintained in constant tension, it keeps the grab closed, acting through the closing mechanism, 13 and 14.

If while the grab is being lowered the brake, 12, is applied, the rope, e, is held and the grab is suspended by it, the drum, l, continues to revolve, being still driven through the epicyclic gear, and the rope, h, still paid out, allowing the mechanism, 13 and 14, to be liberated and the grab opened.

If, when the grab has partially or fully opened, the parts of the epicyclic gear are connected by the clutch or mechanism, and the brake, 12, liberated, the drums, g and l, again both revolve, but the parts of the epicyclic gear being now connected together, it no longer maintains the relative tensions of the ropes but its parts revolving at a fixed relative rate, the speeds of the two ropes are now also relatively fixed, and their movement does not then operate the mechanism 13 and 14; the grab therefore remains open while being lifted or lowered. To close the grab the brake, 12, is again applied, the epicyclic gear freed from the clutch or connecting mechanism, and the motor, p, started in the direction required to haul in the ropes whereupon the brake, 12, holds the drum, g, and rope, e; but the drum, l, revolves and hauls in rope h, closing the grab through the mechanism, 13 and 14. The brake, 12, can then be again freed. The driving member of the gear is provided with a brake, 67, for controlling the speed of the driver when desired.

If the rope, e, is directly connected to the frame of the grab, the speeds of the ropes, e and h, are equal, while the grab is being lifted or lowered, and the parts of the epicyclic gear proportioned accordingly. The rope, e, however, instead of being directly connected to the grab, may, as shown in dotted lines in Fig. 4, be carried round sheaves 18, 18, mounted on the grab, and the end of the rope attached to the carriage. By this arrangement, twisting of the grab during suspension is prevented. In this case, however, when the grab is being lifted or lowered, the speed of the rope, e must be double the speed of h, and the parts of the epicyclic gear modified in proportion, as represented in Fig. 5. The parts of the epicyclic gear may be connected directly to the drum, as indicated in Fig. 4, or indirectly, as in Fig. 5.

If the third drum, w, is rotated by its motor, q, one of the ropes, r or s is hauled in, and the other paid out, causing the carriage, b, (Fig. 4) to move along the track in one direction or the other, according to the direction of rotation. When the carriage is moved to the right in Fig. 4, the rope, e, is thereby hauled out, and unwound off the drum, g, which rotates and through the epicyclic gear also rotates drum l, taking in the slack of rope, h, as the carriage moves. It will be seen that although the motor, p, is at rest, the drums g and l are free to move; but the relative direction of their rotation is opposite to that of their rotation when the motor, p, is running. Therefore the epicyclic gear acts as a balancing gear when the grab is being lifted or lowered, and also as a compensating gear when the carriage is being moved. When the carriage is moved to the left in Fig. 4, the parts act in the same way as when it is moved to the right, but in opposite directions.

The operation of (a) lifting and lowering and of (b) traversing the carriage are quite independent and the one does not affect the other. They may therefore be carried on separately or simultaneously in any directions or at any speeds.

The parts of the epicyclic gear may be arranged in any suitable manner other than shown in the figures, provided that any two of the parts are respectively connected to the two drums, g and l, and the third part to the motor p. Any convenient form of traversing gear may be used in place of the drum, w, and motor, q, and motors of any suitable forms may be used.

Instead of the grab shown any form of cage or bucket may be used, as shown for example, in Fig. 6, where the bucket, 20, is suspended from the ropes, e, and h, through the hooks, 21 and 22, chains 23 and 24, and block, 25. The operations of lifting and lowering the bucket are the same as those described in connection with the two rope grab. If the rope, e, is held and rope, h, paid out, as in opening the grab, the sliding part, 26, falls, and the lever, 27, coming into action, lifts the secondary chain, 24, and hook, 22, thereby through the connection, 28, lifting the latch, 29, and allowing the bucket which is mounted on trunnions, 30, to turn over. Any similar motions may be imparted to the appliances used.

Instead of grabs or buckets, any other appliances may be used for lifting the material to be handled—for example, it may be carried in bags or slings. Ropes or chains may be used as found convenient, and instead of being directly connected to the various parts described, may be connected through purchase blocks, such as in Fig. 1, where the rope, e, is shown in dotted lines, e', passing round a purchase, 31, and lifting the load, 32.

Instead of being passed over sheaves in the carriage, and attached to the load, the ropes may be arranged as in Fig. 7, where rope, e, is coiled in a drum, 33, mounted on the carriage, b, so that when rope, e, is operated, the drum, 33, is rotated, and drum, 34, being connected with it also rotates, and operates the rope, 35, which is attached to the load 32. The end of the rope, e, may be attached to drum, 33, or coiled round it, and carried on, as indicated by dotted lines, 36, and led to the end of the track and thence back to the drum, g, so that when drum, g, rotates, the ropes, e, and 36, act in a manner of an ordinary endless rope drive. Any of the ropes or chains may be connected indirectly or continued in a similar manner.

To prevent the swinging of the load when suspended from the carriage, in Figs. 8, 9 and 10, a rope, 37, is shown, attached to the load, 32, and to a prolongation or bracket, 38, of the carriage, b. A drum, 39, mounted in the bracket receives the end of a rope, 37, which is coiled upon it. A spring, 63, contained in drum, 39, to which one end is attached while the other is attached to a fixed spindle, 64, tends to coil up rope, 37, its strength being too small to exert any appreciable pull on the load, 32. When owing to a swing of the load, 32, the rope, 37, is pulled out, it rotates drum, 39, in such a direction as to cause a pawl, 40, mounted on the drum to engage with a ratchet wheel, 66, on a friction drum, 41, the motion of which is restrained by the brake band, 65, connected to the bracket, 38. A swing of the load in the other direction slackens rope, 37, and the spring in drum 39, causes it to rotate and coil up the slack, the pawl, 40, riding over the projection on the ratchet wheel, 41, and the drum, 39, being therefore free to move in that direction. The rope, 37, may be attached to any other convenient part on the carriage, b, or to the structure of the track, and the drum 39, may be mounted in any other convenient position. Instead of one steadying rope, 37, other ropes such as 42, may be added, acting in opposition.

One convenient form of gear for a two rope grab is shown in plan in Figs. 11 to 14, where drum, g, is connected to a bevel wheel, n, forming one part of the epicyclic gear through the spur wheels, z and z', the wheel x, being attached to a brake disk, 50, which is likewise attached to the bevel wheel, n, these two wheels, z, and n, and the disk, 50, being loosely mounted upon the shaft. The drum, l, is geared to the second member, m, of the epicyclic gear through the wheels, t' and t, the latter wheel being secured to the crown wheel, m, which with the wheel, t, is loosely mounted upon the shaft. The third member, v, of the gear is a disk secured firmly to the shaft, 68, and carrying the bevel wheels, o, o. The motor, p, is connected to this member, v, through the pinion, y, and the spur wheel, y', which latter is keyed to the shaft, 68, to which the member, v, is secured. The disk, v, is provided with a brake, 67, and the disk, 50, is provided with a band clutch or brake, 80, carried by the member, v, and operated by the spindle, 51, which passes through a hollow portion of the shaft, 68, to lock the disks, 50 and v, of the first and third members together, or allow any desired relative movement to take place between them. The brake, 80, preferably consists of two separate bands, each operated by a lever, 70, one end of which is in engagement with the spindle, 51, while the other is connected to a link, 71, attached to a side block, 72, guided in a slot in the member, v. The block is connected to one end of a lever, 73, on a spindle, 74, passing through a bearing in the disk and having a lever, 75, connected to one of the bands of the brake. Lateral movement of the spindle, 51, applies or removes a brake and thereby connects or disconnects the members, v and 50, from one another.

Although we have described epicyclic gearings having bevel wheels, it will be understood that one having spur wheels only, or any other form of epicyclic mechanism, may be substituted, and although in the specification and drawings we have described and shown particular forms and arrangements of the various appliances, they may be constructed in any other convenient way within the scope of the invention, according to the conditions under which they are to be operated.

In this specification the word "transporter" is used to indicate any apparatus in which traversing takes place in addition to hoisting and lowering.

Having now particularly described and ascertained the nature of our said invention, and in what manner the same is to be performed we declare that what we claim is:—

1. In combination in a cable transporter; a trackway; a carriage supporting a sheave; a load-carrying element; a winding drum and a traversing drum; a hoisting cable which is attached to the load-carrying element and which passes over said sheave and engages the hoisting drum; a traversing cable attached to said carriage and engaging the traversing drum, an epicyclic gear two parts of which are connected to drums; two motors, one permanently geared to a third part of the epicyclic gear and one permanently geared to the traversing drum; and braking means.

2. In combination in a transporter; a trackway, and carriage thereon supporting a pair of sheaves; two winding drums; epicyclic gear connecting the two drums together, one member of the epicyclic gear being permanently connected to one drum and another member being permanently connected to the other drum; a double grab with closing means; a cable from one of said drums passing over one of said sheaves to carry the grab; a cable passing from the other of said drums over the other of said sheaves to the closing means of the grab; a motor permanently connected to the third member of said epicyclic gear; a traversing drum; a motor permanently connected therewith and cables of said traversing drum attached to both ends of the carriage.

3. In combination in a cable transporter; a trackway; a carriage supporting a sheave; a load-carrying element; a winding drum and a traversing drum; a hoisting cable which is attached to the load-carrying element and which passes over said sheaves and engages the hoisting drum; a traversing cable attached to said carriage and engaging the traversing drum, an epicyclic gear two parts of which are connected to drums; two motors, one permanently geared to a third part of the epicyclic gear and one permanently geared to the traversing drum; and braking means; means acting to restrain the swinging of the load, said means including a spring drum on a carriage, a ratchet with friction member connected with the ratchet, a pawl on the drum acting to engage with the ratchet when the load swings in the other direction.

In testimony whereof we have signed our names to this specification in the presence of two subscribing witnesses.

JOHN RIDLEY TEMPERLEY.
JOSEPH TEMPERLEY.
WILLIAM ALEXANDER.

Witnesses:
BERTRAM H. MATTHEWS,
C. F. SRADGLY.